(12) United States Patent
Wells et al.

(10) Patent No.: US 11,846,578 B2
(45) Date of Patent: Dec. 19, 2023

(54) APPARATUS AND METHOD FOR CHARACTERIZATION OF PARTICLES

(71) Applicants: David Nelson Wells, Silver Spring, MD (US); Rocco D. Pochy, Medford, OR (US)

(72) Inventors: David Nelson Wells, Silver Spring, MD (US); Rocco D. Pochy, Medford, OR (US)

(73) Assignee: Lighthouse Worldwide Solutions, White City, OR (US)

( * ) Notice: Subject to any disclaimer, the term of this patent is extended or adjusted under 35 U.S.C. 154(b) by 197 days.

(21) Appl. No.: 17/034,428

(22) Filed: Sep. 28, 2020

(65) Prior Publication Data

US 2022/0099552 A1 Mar. 31, 2022

(51) Int. Cl.
*G01N 15/14* (2006.01)
*G01N 15/02* (2006.01)

(52) U.S. Cl.
CPC ..... *G01N 15/1404* (2013.01); *G01N 15/0205* (2013.01); *G01N 2015/1493* (2013.01)

(58) Field of Classification Search
CPC ........... G01N 15/1404; G01N 15/0205; G01N 2015/1493
See application file for complete search history.

(56) References Cited

U.S. PATENT DOCUMENTS

| 4,606,636 A * | 8/1986 | Monin | G01N 15/1436 |
| | | | 356/338 |
| 4,798,465 A * | 1/1989 | Knollenberg | G01N 15/0205 |
| | | | 356/336 |
| 5,731,875 A * | 3/1998 | Chandler | G02B 6/4249 |
| | | | 356/336 |
| 6,034,769 A * | 3/2000 | Yufa | G01N 15/02 |
| | | | 356/336 |
| 6,519,033 B1 * | 2/2003 | Quist | G01N 15/14 |
| | | | 356/337 |
| 6,590,652 B2 * | 7/2003 | Quist | G01N 15/1456 |
| | | | 356/338 |

(Continued)

FOREIGN PATENT DOCUMENTS

CN 105487100 A * 4/2016
EP 1356859 A1 * 10/2003 ............ B01F 5/0453

*Primary Examiner* — Kevin Quarterman
*Assistant Examiner* — Jarreas Underwood
(74) *Attorney, Agent, or Firm* — Miodrag Cekic; Intellectual Properyt Strategists, LLC

(57) ABSTRACT

The current invention pertains to devices for counting and sizing particles suspended in a stream of fluid flowing in a predominant flow direction. Such devices comprise a fluid stream forming system having a directional element arranged to form the stream of fluid flowing in predetermined direction of fluid flow; a laser beam forming optical system including at least one source of laser light having at least one wavelength between 200 nm and 1000 nm, a profiling optical subsystem, having at least one collimator lens and at least one convergent lens, positioned to arrange the laser light in a laser beam along a laser beam axis directed substantially to illuminate a prearranged scattering volume of the stream of fluid, and at least one laser beam dump. Also, the device includes a wide-angle detecting subsystem and wide-angle back-reflecting subsystem.

30 Claims, 7 Drawing Sheets

(56) References Cited

U.S. PATENT DOCUMENTS

| | | | | |
|---|---|---|---|---|
| 6,592,822 B1* | 7/2003 | Chandler | ............... | G01N 21/05 |
| | | | | 356/73 |
| 6,813,017 B1* | 11/2004 | Hoffman | .............. | G01N 15/147 |
| | | | | 356/417 |
| 6,859,277 B2* | 2/2005 | Wagner | .................. | G01N 15/14 |
| | | | | 356/337 |
| 6,975,400 B2* | 12/2005 | Ortyn | ....................... | G02B 7/28 |
| | | | | 356/417 |
| 7,990,525 B2* | 8/2011 | Kanda | ................ | G01N 15/1429 |
| | | | | 356/73 |
| 9,134,230 B2* | 9/2015 | Jiang | .................... | G01N 21/645 |
| 10,184,880 B2† | 1/2019 | Godoy | | |
| 2006/0256333 A1* | 11/2006 | Bloom | ............... | G01N 15/1475 |
| | | | | 356/336 |
| 2007/0146703 A1* | 6/2007 | Adams | ................ | G01N 15/147 |
| | | | | 356/337 |
| 2015/0177118 A1* | 6/2015 | Johnson | ............. | G01N 15/1404 |
| | | | | 435/5 |
| 2018/0038784 A1* | 2/2018 | Marks | ................ | G01N 15/1434 |

\* cited by examiner
† cited by third party

APPARATUS AND METHOD FOR CHARACTERIZATION OF PARTICLES

FIELD OF THE INVENTION

The present invention relates to the field of particle detection and characterization systems and methods. More specifically the inventions of present Application pertain to a particle detection systems and processes capable of detection and physical characterization of individual particles suspended in a predetermined volume of a streaming of fluid, and in particular, to detect particles in air particularly in a clean room environment. The methods and systems of the current invention utilize laser light scatter events wherein a beam of light intercepts a predetermined volume of fluid and a light collection and detector system detects the light redirected by the suspended particles out of the predetermined volume of a streaming of fluid. Characterization of the particles, including information pertinent to the number concentration of particles versus size of the suspended particles may be obtained from the light scattering data.

BACKGROUND OF THE INVENTION

Needs to detect, process and characterized particles suspended in a fluid stream, and in particular in air, has been of great interest for several processes. One traditionally important example pertains to particle contamination of pharmaceutical and medical materials. One of progressively more stringent requirements for particle contamination control resulted from development of "clean room processing" of electronic materials, where previously negligible concentrations of contaminating particles may render entire series of sophisticated electronic or electro-optical components useless or, worse, dangerously unreliable. In such applications, developments of sophisticated protocols and processes for systematic monitoring and management of particle-related contamination based upon unobstructive, extensive, reliable, and actionable optical scattering methods are of permanent interest.

It is well known that optical systems for detecting, sizing, and counting particles suspended in a stream of air have been based on detection of light scattered by the particles suspended in the air flow through a predetermined (stationary) volume of space illuminated by a well-characterized light source. In general, lasers radiating coherent beam of light, most frequently having wavelength in range of visible light, are preferred choices for the light sources at least because of inherent stability, reliability, broad availability (including lasers, detectors, and pertinent optical components and systems.) In particular, diode lasers are of interest at least in part because of compactness, moderate power requirements sufficient to both detect the presence of ("sensitivity"), as well as capability determine differences in sizes of individual particles ("resolution").

It is generally understood that, as the scattering process frequency fundamentally depends on the product of number densities of scatterers and fluxes of (impacting) photons, both, sensitivity and size resolution statistics benefit from the increase of the power of the lasers. In practice, the above benefits are limited at least by the increase of detection uncertainties (generally labeled as "noise") frequently associated with component imperfections (optical, mechanical, and electronic). In the case of the intense laser beam optics, limitations associated with shaping, redirection, and focusing of the beam, and controlling loses of photon flux, uniformity and coherence are specially demanding. Although, the problems pertinent to high order optical imperfections (distortions and aberrations), multiple reflections, edge diffraction, temperature gradients etc. can be mitigated by skillful optical arrangements, problems pertaining to parasitic scattering processes, including molecular scattering on the nitrogen and oxygen molecules ("air glow") may represent difficult-to-avoid obstacles limiting the performance of the high-power particle counters and analyzers.

Presently, infrared diode lasers light sources are typically employed in the field of device and methods for counting and sizing particles suspended in the stream of air. The resulting infrared laser beams are formed and redirected to illuminate predetermined volumes of generally elongated (oblong or rectangular) channels of fluid flows using variety of optical components arranged to substantially uniformly image the laser beam on the predetermined volumes while the unscattered radiation is removed from the system by absorption (usually in dedicated beam dumps) before it may create undesirable light noise by higher order optical phenomena (e.g. diffraction, air glow, multiple reflections etc.) Significant portion of infrared light locally scattered by the suspended particles is redirected to the detection subsystem which typically incorporate single-element or multi-element Avalanche Photodiode (APD) detectors or arrays.

In the embodiments of the infrared systems in accordance to the prior art that utilize multi-element detectors having sensitive areas segmented in a plurality of pixels capable of substantially independent detection of incident photons, it may be of interest to collect and image the light scattered during a single scattering event onto a light spot commensurate to the size of a single APD pixel in order to improve sensitivity and signal-to-noise ratio. By providing a system where each APD pixel element can only "see" only a narrow region of the illumination area, rather than the entire illumination region, an improvement in the signal-to-noise is obtained because the APD element does not collect the background molecular glow of the entire illuminated area, but rather only a small area of the total illumination zone. Prior art systems, such as the system shown in FIG. 1, may consist of two completely independent collection systems with independent APD arrays. The independent collection systems, although efficient, are complex and costly.

In contrast, embodiments of devices for counting and sizing particles suspended in a stream of fluid in accordance with the present inventions incorporating generally two improvements. First, a visible (preferably blue) light which offers higher sensitivity is used. Second, the improved device utilizes a comparatively simpler scattered light collector subsystem arranged to collect light from a single scattering event. Light scattered in two opposite directions is optically combined into a single spot commensurate with the size of a single photosensitive element of the ADP detector array, rather than utilizing two separate arrays in opposite hemispheres. By applying both methods simultaneously, the system of the current invention exhibits advantages of superior sensitivity and signal-to-noise and detect smaller particles than prior systems such as is shown in FIG. 1.

This improvement is due both to the inherent gain in signal to noise due to the shorter wavelength (visible, preferably blue) light scattering processes, but also is due to the new feature of this invention that comprises a back-reflection optical system that collects light going in both directions and focuses the light on individual APD elements properly to increase the total light impinging on the APD elements. Although prior art back-reflection systems are known, these back-reflection systems, such as those using a spherical back-reflector mirror system, did not properly direct light emitted by a specific region along the nozzle to a single APD photosensitive elements location, but rather inverted the image and directed light to a location symmetrically opposed to the first region of focus. By employing the novel optics of this new invention, the intensity of light collected by a single scatter particle is increased by nearly a factor of two, thus improving sensitivity of the system above that which was possible with prior systems.

SUMMARY OF THE INVENTION

The current invention pertains to devices for counting and sizing particles suspended in a stream of fluid flowing in a predominant flow direction. Such devices comprise a fluid stream forming system having a directional element arranged to form the stream of fluid flowing in predetermined direction of fluid flow; a laser beam forming optical system including at least one source of laser light having at least one wavelength between 200 nm and 1000 nm, a profiling optical subsystem, having at least one collimator lens and at least one convergent lens, positioned to arrange the laser light in a laser beam along a laser beam axis directed substantially to illuminate a prearranged scattering volume of the stream of fluid, and at least one laser beam dump. Also, the device for counting and sizing particles includes a scattered light collector subsystem arranged to collect and detect at least a portion of light redirected by the suspended particles from the laser beam having at least one wide-angle detecting subsystem and at least one corresponding wide-angle back-reflecting subsystem; and an electronic signal-processing subsystem arranged to process and interpret distinct electronic responses generated by the at least one wide-angle detecting subsystem and determine count and size pertinent to the particles suspended in a stream of fluid.

The wide-angle detecting subsystem and the corresponding wide-angle back-reflecting subsystem share a common optical axis simultaneously perpendicular to the laser beam axis and the predetermined direction of fluid flow. The wide-angle detecting subsystem incorporates at least one photodetector enhanced for repetitive detection of the laser light scattered by the particles suspended in the scattering volume of the stream of fluid and generation of the distinct electronic responses.

BRIEF DESCRIPTION OF THE DRAWINGS

The above and other embodiments, features, and aspects of the present invention are considered in more detail in relation to the following description of embodiments shown in the accompanying drawings, in which.

DESCRIPTION OF SEVERAL EMBODIMENTS OF THE INVENTION

The current invention may be better understood by referring to the following descriptions, which should be read in conjunction with the accompanying drawings of particular exemplary embodiments. This description of the illustrated embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also understand that such equivalent assemblies do not depart from the spirit and scope of the invention in its broadest form.

Figure 1:
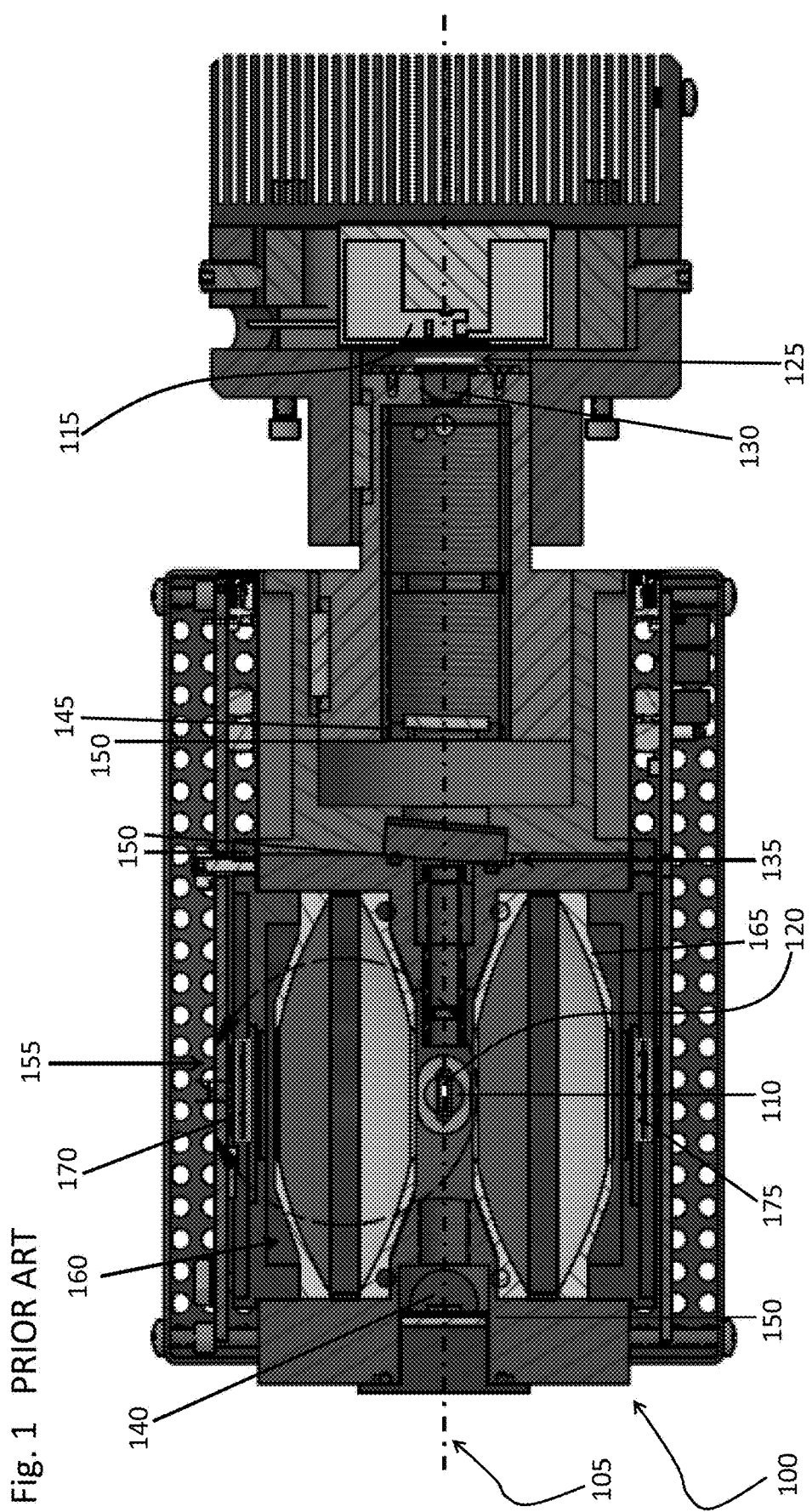
FIG. 1. is a cross-sectional illustration of one embodiment in accordance with prior art.

The FIG. 1 represents a cross-sectional view of a particle-detecting section 100 of a prior art device for counting and sizing particles suspended in a stream of fluid. The plane of cross-sectional cut is perpendicular to the predominant flow direction of the fluid flow (therefore not shown in FIG. 1) and contains optical axis 105 of a laser beam. A fluid stream forming system includes a directional element in the form of nozzle 110 arranged to form the stream of fluid flowing in predetermined direction of fluid flow (perpendicular to the plane of the FIG. 1).

A laser beam is emitted from a light source 115 represented in the depicted embodiment of prior art by an infrared ("IR") laser diode chip having typically a 100 µm long emitter strip capable of emitting maximum power of 3 W at nominal 808 nm wavelength into a space angle characterized by a field typically 8 degrees by 30 degrees if no lenses are present, or with a field of 8 degrees by about 1.5 degrees FWHM if an optical fast-axis collimator 125 is used to collect the more divergent or "fast" axis of the laser. Further optics are used to focus the beam to the nozzle 110. These additional optics include one slow-axis collimator lens 130 arranged to counter the laser beam dispersion in the perpendicular plane, and one imaging lens 135 (plano-cylindrical in the illustrated embodiment) arranged to relay the image of the FAC lens 125 to the scattering volume 120. Additionally, one laser beam dump 140; one optical tubing 145 and a plurality of supporting members 150 are provided.

A scattered light collector subsystem 155 is arranged to collect and detect at least a portion of light redirected upward by the suspended particles from the laser beam. Subsystem 155 incorporates at least one photodetector 170. In different embodiments variety of PIN diodes, ADP photodetector arrays, or many equivalent single-element or multi-element arrays of Silicon photomultipliers ("Si-PM") may be used. In in a common prior art embodiment, the array is a multi-element APD array may be used.

In the FIG. 1. illustrated prior art embodiment, an additional functionally separable wide-angle reflecting subsystem 165 of similar design corresponding to the wide-angle detecting subsystem 160 is provided, including an additional APD array 175. In the embodiment illustrated in FIG. 1, the two wide-angle subsystems 160 and 165, that incorporate two photodetector APD arrays 170 and 175, are arranged to detect light going in two corresponding opposite directions. Additionally, electronics is provided to process, and "OR" the separate detection threshold circuits of the aforementioned photodetector APD arrays 170 and 175. It may be desirable in some embodiments to simplify the subsystem 155, illustrated in FIG. 1 and arranged to process signals from light going the two opposite directions using two substantially separate and potentially pricy electronics circuits, and replace it with an integrated subsystem arranged to add the light going two different directions to a common APD element on a single side.

Figure 2:
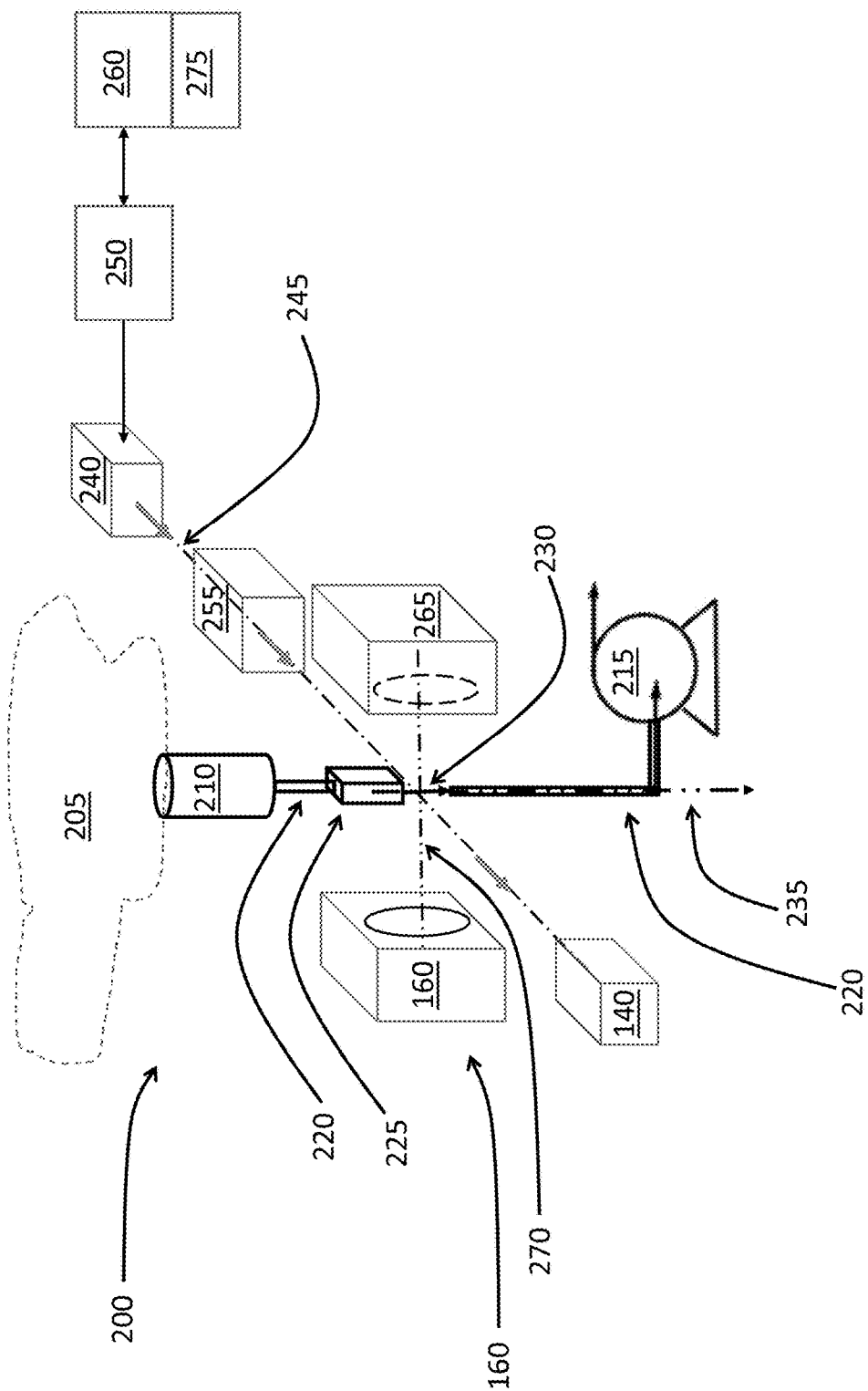
FIG. 2. is a schematic illustration of one embodiment of the current invention.

Some of the above challenges of the prior art have been resolved and/or alleviated by the features designed and executed in a device 200 for counting and sizing particles suspended in a stream of fluid of the current invention, as schematically illustrated in FIG. 2. It should be noted that the schematics in FIG. 2 represents a conceptual rendering of some embodiments of the current invention. It may be evident to the practitioners that various functional subsystems separated by illustrated conduits and connectors may be arranged integrally in different embodiments, to the ultimate level of integration where all subsystems may be closely positioned and, for example, enclosed by common enclosures or housings.

In other versions of current embodiments, various subsystems may be further distributed exhibiting additional physical separation and, consequently, additional conduits and connectors. Finally, in yet another sets of embodiments, more than one of illustrated subsystem may be connected to common supporting components (e.g. common power supplies end/or common information processing units), for example, in order to provide more accuracy, reliability, and/or coverage of extended volumes and additional processes under observation, monitoring, or control.

The device 200 has been arranged to collect samples of fluids from the volume of fluids 205 using a sampling device 210, which may be enabled by at least one fluid pump 215. Many commercial fluid pumps may be used in different embodiments of the current invention. For the embodiments for detecting and sizing particles in air, pumps with capabilities to drive air flows in the range of 2 to 100 liters per minute are common. At least one fluid conduit 220 may be arranged to transfer samples of fluid to a fluid stream forming system 225, which includes a directional element in the form of the nozzle 110 arranged to form the stream of fluid 230 flowing in predetermined direction 235 of the fluid flow. In different embodiments different arrangements for forming of fluid streams may be implemented.

A laser beam forming optical system including at least one source of laser light 240 in the form of at least one visible light (preferable blue light) laser diode. In a particular group of embodiments the laser light in the wavelength range from about 440 nm to about 460 nm (depending on the temperature) have been emitted from an 1 µm×40 µm emitter of the OSRAM Opto Semiconductors PLPT9 450D_E series laser diode (emitting max. 3.5 W at nominal 447 nm central wavelength). In addition to 100% higher emitted power that comparable IR laser diodes of prior art, the ~450 nm photons exhibit substantially an order of magnitude larger scattering cross-section for "difficult to detect" particles having characteristic dimension in range from about 100 nm to about 300 nm. Such advantage diminishes until about 400 nm being substantially similar for readily-detectable particles measuring 500 nm and above, which may be routinely detected and characterized by devices of prior art as represented in FIG. 1.

The above distinction is of particular importance when the process operators attempt to certify particular facilities for the highest standards ("ISO 1" class) of clean room certification. The ISO 1 standard allows for particle number densities of max. 10 particles/m$^3$ for particles sizes of 100 nm and above but only 1.02 particles/m$^3$ for 300 nm and above. Therefore, for the comparable levels of noise, when a properly calibrated device of the current invention, after processing 1 m$^3$ of air, can determine presence of 9/m$^3$ 100 nm particles in 10 counts (10% noise-to-signal ratio), an IR device of prior art can't statistically discriminate between real 100 nm particles present in processed 1 m$^3$ of processed air and the random noise counts (100% noise-to-signal ratio).

The laser diode 240 emits a strip of light generally along a laser beam axis 245 in a direction generally perpendicular to the predetermined direction 235 of the fluid flow. In an illustrative, but idealized approximation, the scattering volume 120 formed at the intersect of the laser beam and the fluid flow channel may be uniformly irradiated providing comparable probability for detection of the suspended particles with acceptable variability caused by particles' orientation, position, or motion in the fluid.

In the above model, the irradiation of scattering volume may be understood as imaging of the laser diode emitter (e.g. 1 µm×40 µm area having approximately uniform radiance) onto the fluid stream formed by the nozzle 110 (opening 1.2 mm×6.7 mm). As the laser beam needs to cover the entire with of the flow (1.2 mm of the short dimension of the nozzle), the emitter image at the nozzle needs to be magnified ~30× while maintaining approximately 50% or less defocusing ("focal beam waisting") over ±3.35 mm length (long dimension) of the nozzle (e.g. 60 µm at −3.35 mm, 30 µm at focus, and 60 µm at +3.35 mm).

From the above considerations, practitioners may derive some desirable features of the laser 240 for various embodiments of particular importance for many clean room applications. As the strip laser diodes emitting in the expended visible range of wavelengths (e.g. 200 nm to 800 nm) exhibit degeneration of total emitted power with increase of the emitter temperature, it is desirable that the leaser diodes for the devices of current embodiments maintain no less than 0.2 W of radiated power at nominal 80° C. In order to achieve desirable power emission, the laser diodes 240 may be powered and controlled by at least one programmable power supply/controller 250 arranged to maintain laser diode 240 performance at the predetermined level. In several embodiments the power supply/controller 250 may include subsystems for powering and controlling detectors (e.g. providing data preprocessing, timing, and reversed bias for at least one ADP; as shown in FIG. 2 and further discussed below), and managing fluid sampling.

Furthermore, as introduced in the recitations pertinent to the above approximative model, the length of the emitter of the laser diode 240, in addition to the direct contributions to the output power (e.g. 0.2 W to 3.7 W), has defining role in the determination of optical characteristics of the laser beam profiling optical subsystem 255. As the profiling optical subsystem 255 for the emitter magnification of more than 100× (for the nozzle having the short dimension ~1 mm) may be complex and exceedingly high price (in order to provide acceptable uniformity of irradiation), emitter length of less than 10 µm may be considered impractical for the devices in accordance with the current invention. Thus, magnifications of 20× to 60× (emitters of 15 µm to 60 µm in length) may be preferable for the embodiments of current devices.

The device 200 for counting and sizing particles further incorporates a detecting system 160 including at least one wide-angle detecting subsystem 260 incorporating at least one APD detector, and the at least one corresponding wide-angle back-reflecting subsystem 265, which share a common optical axis 270 simultaneously perpendicular to the laser beam axis 245 and the predetermined direction of fluid flow 235. The device 200 also may incorporate at least one electronic signal-processing subsystem 275 arranged to process and interpret distinct electronic responses generated by the detecting system 160 and determine count and size pertinent to the particles suspended in a stream of fluid.

Some embodiments of the device 200 may also include the beam dump 140 and at least one data input and output, display, and communication system 280.

Figure 3:
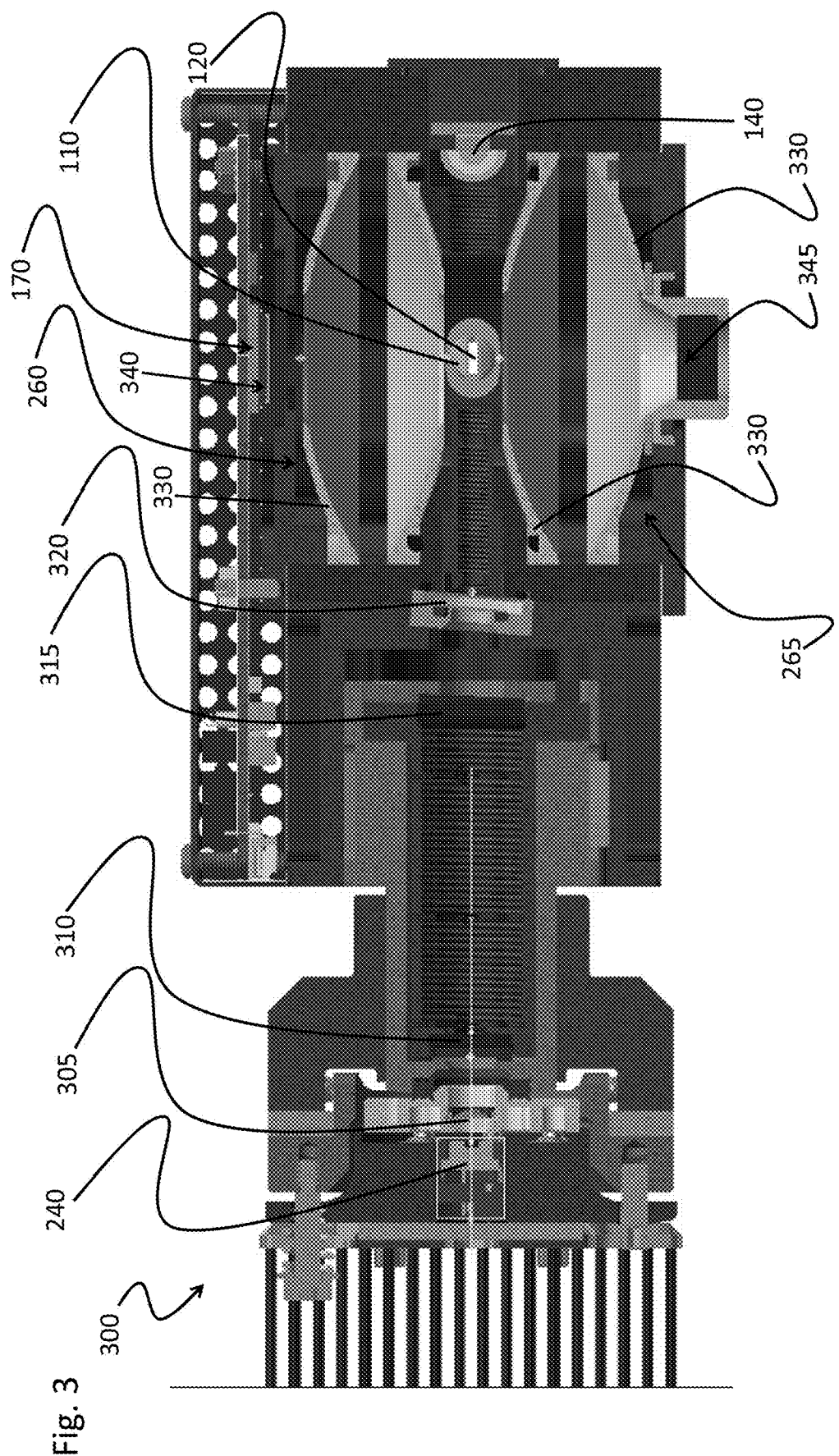
FIG. 3. is another cross-sectional illustration of one embodiment of the current invention.

One cross-sectional view of particular embodiment 300 of the device 200 is rendered schematically in the FIG. 3. The illustrated embodiment has been represented in a cross-sectional view having the cross-sectional plane corresponding to such of the FIG. 1 (except for the 180° relative in-plane rotation of the device embodiment 300). The embodiment of current invention incorporates several improved features comparable to such illustrated in FIG. 1.

The profiling optical subsystem 255 of the embodiment illustrated in FIG. 3, incorporates at least one aspheric collimator lens 305, first convergent lenses 310, and second convergent lens 315, positioned to profile the laser light in the laser beam along the laser beam axis 245 directed substantially to illuminate the prearranged scattering volume 120 in the stream of fluid 230. The aspheric collimator lens 305 of the above embodiment may be chosen to correlate to the emitter geometry of the laser diode 240, while the convergent lenses 310 and 315 may be arranged to control uniformity of irradiation of irradiated volume of the stream of fluid 230 in the directions across the nozzle 110 and along the flow of the stream of fluid 230 (in the same order).

It may be noted that in different embodiments different optical arrangements may be employed, depending on the chosen design parameters particularly pertinent to the shape and position of the nozzle 110. For example, in some embodiments the convergent lens 315 may be omitted and the dispersion along the stream of fluid 230 controlled, for example, by changing the properties of first convergent lenses 310 which could instead of being a cylindrical lens, as illustrated in FIG. 3, could be replaced in different embodiments by a plano-convex spherical lens, eliminating the need for the convergent lens 315. In addition, the embodiment of device 300 may include at least one polarization rotator plate 320 arranged to adjust the plane of polarization of the laser beam in accordance with the geometry and orientation of the nozzle 110.

The embodiment of the current invention illustrated in FIG. 3 also includes new version of the detecting system 160 which incorporates one wide-angle detecting subsystem 260 having the APD detector 170, and one corresponding wide-angle back-reflecting subsystem 265.

The wide-angle detecting subsystem 260 of the embodiment illustrated in FIG. 3 incorporates at least two spherical or, preferably, parabolic mirrors, 330 positioned to share the common optical axis 270 and one HAMAMATSU S15249 Si ADP multielement array having 16 pixel linear configuration of 0.7 mm×2.0 mm pixels with a gap between elements of 0.06 mm. As an example, a sensor with 13 active elements of a possible 16 total elements has been configured to form a detector of effective length of 13×0.7 active and 12×0.06 inactive gap area with total span of 9.82 mm. This length substantially "sees" the full length of 6.7 mm long nozzle 110 with an additional 1.56 mm length beyond each end of the nozzle. Such feature may be of interest in the cases wherein the image spot has nominal diameter of around 3 mm caused predominantly by spherical aberration. Such performance may be common for parabolic mirrors with focal length of around 25 mm, which may be recognized by practitioners as an expected size for laboratory instrumentation.

On the other hand, silicon PIN and APD detectors of current inventions, designed to respond efficiently to shorter wavelength (blue light), known to be absorbed by silicon in a significantly shallower surface region than longer wavelength (e.g. infra-red) light, generally are provided with relatively narrower absorption, gain, and intrinsic layer regions. As a significant consequence, the short-wavelength type PINs and APDs, having relatively reduced volume of sensitivity, are found to be less sensitive to background ionizing radiation, when properly integrated in the detecting arrangements.

Namely, by providing the device 200 for counting and sizing particles suspended in a stream of fluid of the current invention laser particle counter with such short-wavelength type APD (including but not limited to the HAMAMATSU S15249), a new low-background laser particle sensor may be achieved having very low sensitivity to ionized or muon radiation relative to the devices of prior art. This feature was verified by actual background count comparisons which showed superior reduction of sensitivity to background radioactivity and cosmic (mostly muon) radiation. Property integrated an biased ADP detector demonstrated reduced background counts due to cosmic muon radiation not exceeding 10 counts in one hour.

Different embodiments of the current invention may utilize longer nozzles 110, which may use all available pixels of 2 mm effective photosensitive elements. Such detector, placed substantially centered and perpendicular to the common optical axis 270, has sufficient sensitivity over visible range of wavelengths (e.g. 400 nm to 850 nm) and can detect and locate and resolve significant portion of impacting photons into 1.5 mm radius (diffuse) particle scattering images between the proximal effective photosensitive elements 340. Because of this sensitivity, the detecting subsystem 260 is recognizes as an "Active Lobe" of the system 160 at least for the purposes of ray tracing investigations.

Similarly, corresponding wide-angle back-reflecting subsystem 265 includes at least two spherical, or preferentially parabolic mirrors 330 positioned to share the common optical axis 270 and at least one reflecting element 345 substantially centered on and perpendicular to the common optical axis 270 to effectively oppose the APD detector 170. At least because of such arrangement of optical elements the back-reflecting subsystem 265 is recognized as a "Passive Lobe" in the ray tracing modeling studies.

It may be known to the practitioners that in different concave mirrors may be used in different embodiments. In particular, different spherical or parabolic mirrors (having focal lengths approximately between 10 mm and 50 mm), or combinations of such may be used in different embodiments.

Furthermore, it may be noted the reflecting element 345 may be in the form of flat mirror (no optical power) or any of comparatively long focal length (e.g. convergent spherical, parabolic or cylindrical reflectors with radii of curvature from about 20 mm to about 200 mm). Such additional optical powers may be desirable for improved collimation and/or focusing of scattered light collected by the back-reflecting subsystem 265, which generally tend to exhibit additional divergences along longer optical paths having additional points of reflections.

Figure 4:
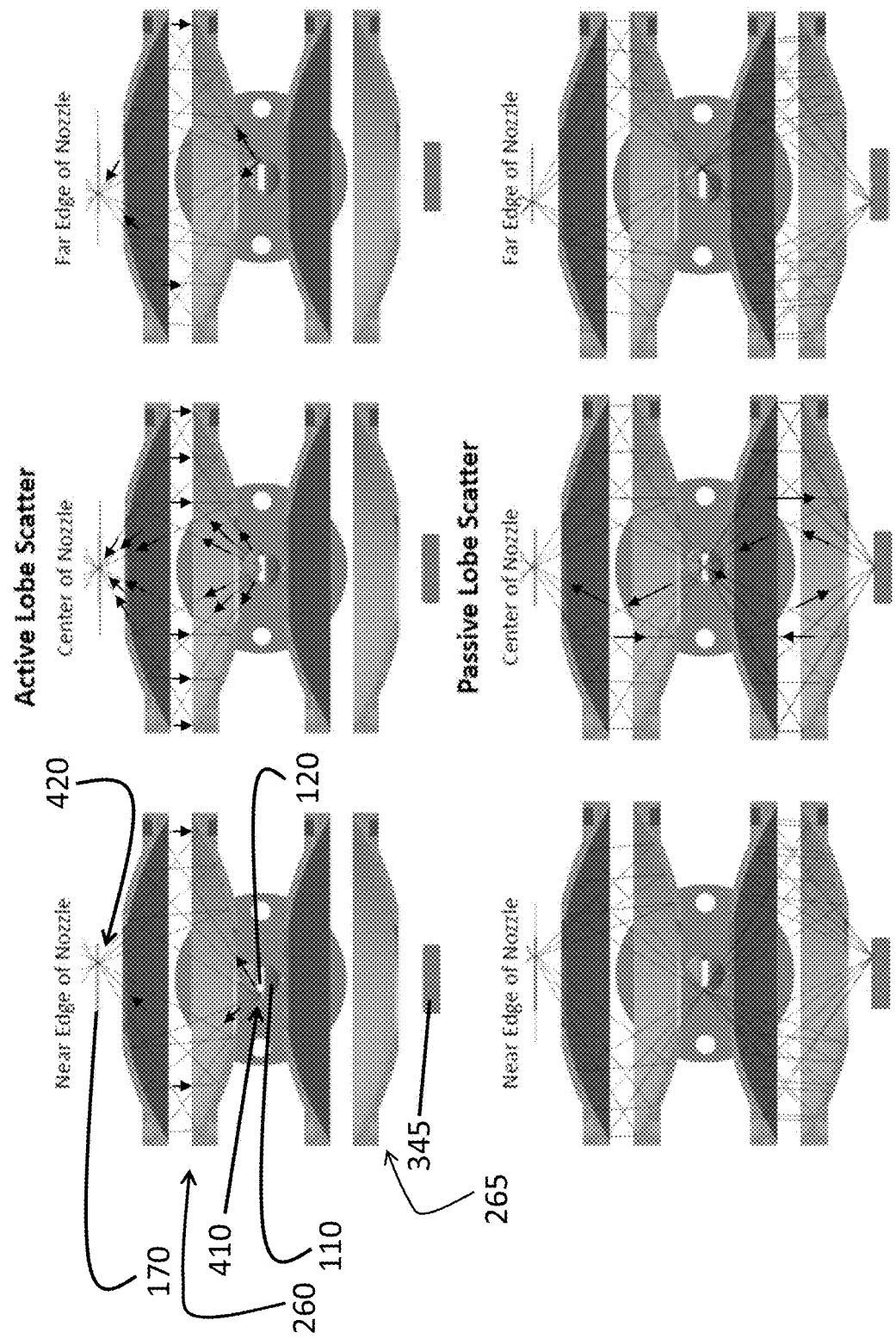
FIG. 4. is yet another cross-sectional illustration of one embodiment of the current invention.

Some functional features of the detecting system 160, as illustrated in FIG. 3, may be more clearly stated in consideration of ray-tracing results illustrated in FIG. 4. The FIG. 4 closely models the embodiments represented by FIG. 3, keeping only the components relevant for the propagations of rays (i.e. optical paths of photons redirected from the laser beam by the particles suspended in the fluid flow) toward the APD detector 170 having plurality of effective photosensitive elements 340. Only the nozzle 110 defining the scattering volume 120 has been illustrated in relation to the wide-angle detecting subsystem 260 and the corresponding wide-angle back-reflecting subsystem 265. The reference numerals for the identical copies of the optical components in five (of six illustrated cases) have been omitted for clarity of the illustration.

In the illustrated ray traces only two sets of three rays have been lunched in each case (sacrificing statistics for transparency) to indicate visually relative sizes of the subsystems 260 and 265 acceptance angles. In the top three cases under the title of "Active Lobe Scatter" the six rays have been launched into the wide-angle detecting subsystem 260 and terminated just behind the plane defined by the sensitive areas (photosensitive elements 340) of the APD 170 for the convenience of obvious detections of the impact areas.

For the final three examples of the raytracing modeling, a corresponding set of six rays have been launched, in the opposite direction from the corresponding Active Lobe rays, toward the subsystem 265. Such "Passive Lobe Scatter" rays have been reflected back (at least twice) by the reflecting element 345 and returned back for to the detecting subsystem 260 for "detections" in the ADP detector 170 and termination just behind the detector.

Several significant features of the system 300 may be concluded by inspection of the illustrated ray-tracing cases. The most directly, the practitioners must conclude that the separate scattering points 410 (representing single particles suspended in the scattering volume 120) ordered from left to right along the nozzle 110 (i.e. in the direction of laser beam propagation 245) have been uniquely (reversely) imaged on the separate effective photosensitive elements 340 of the APD detector 170 in the order opposite from the direction 245.

Even more significantly, one may conclude by inspection that corresponding sets of rays from the "Active Lobe Scatter" and the "Positive Lobe Scatter" examples end up imaged in a common spot 420 on the common effective photosensitive elements 340 in spite of being launched in the extreme opposite directions (segments of the space angles). One important consequence of the above enables one significant intrinsic quality of the embodiments of the current invention pertaining to the fact that individual scattering particles, with no exceptions regarding their positions and orientations, cannot generate multiple signals in different detector pixels, and cannot be "double counted" regardless of the sensitivity, noise discrimination, "dark time" or any other limiting performance parameters of the detecting and processing systems.

The illustrations in FIG. 4 may also reveal that the rays from the Passive Lobe Scatter exhibit somewhat larger dispersion and more diffuse common spots 420 than such for the Active Lobe Scatter. As already discussed above, it may be expected on the basis of necessarily longer optical paths of such rays and larger number reflections that such rays encounter. In the illustrated embodiments having sufficiently large effective photosensitive elements (e.g. from 1 mm$^2$ to 5 mm$^2$) the flat mirror as the reflecting element 345 may be sufficient. In the embodiments that include ADPs with smaller photosensitive elements 340 (e.g. from 0.1 mm$^2$ to 1 mm$^2$) or the devices exhibiting somewhat larger dispersion, a low optical power ("nearly flat") curved reflective element may be incorporated. For example, a spherical or parabolic reflector 345 may be used to reduce the radial extent of the common spot 420, while different cylindrical reflectors having a cylindrical radius from about 20 mm to about 200 mm, may be utilized to control the size of the common spots in parallel or perpendicular directions of the ADP detector linear extent.

Figure 5:
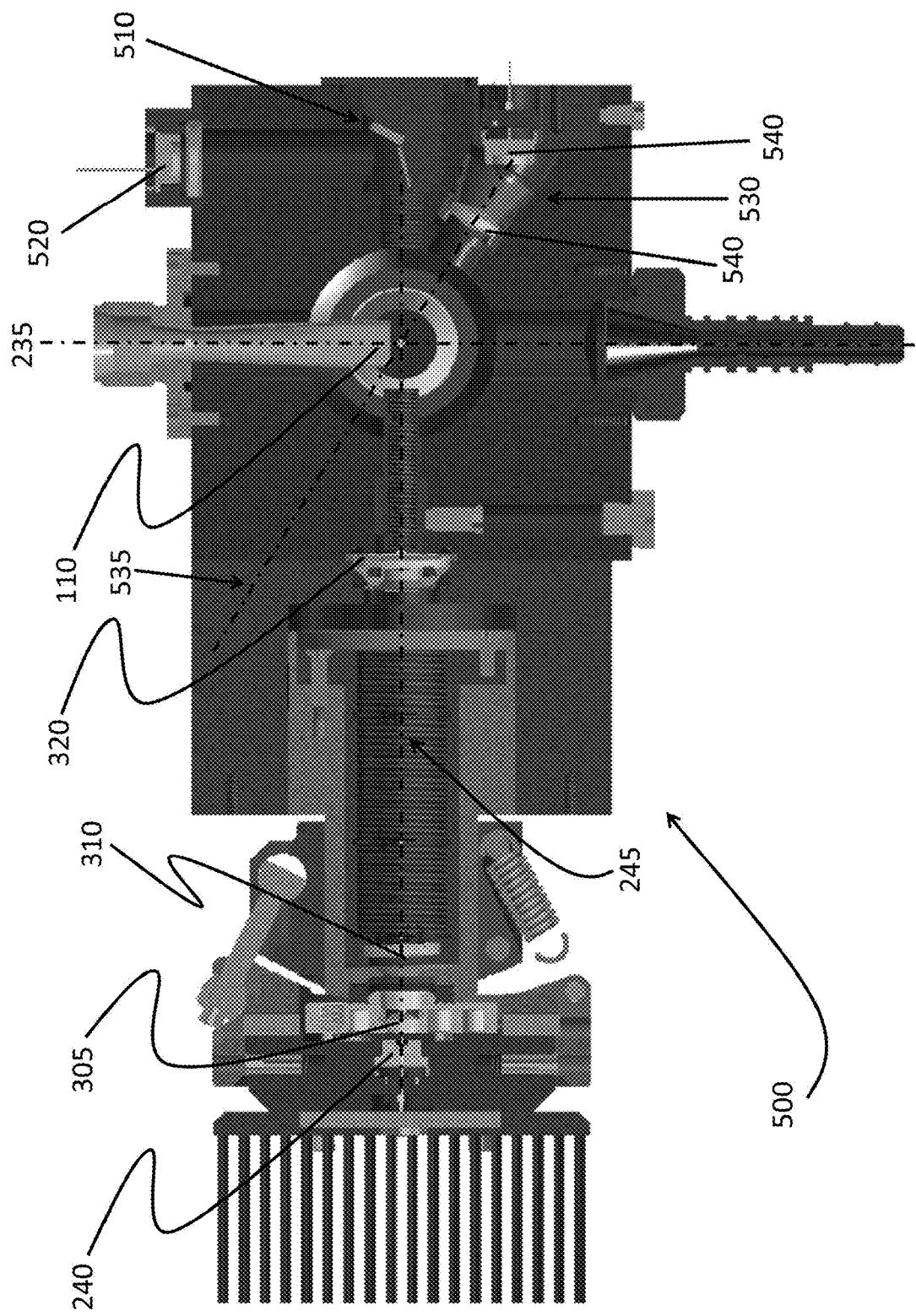
FIG. 5. is a cross-sectional illustration of another embodiment of the current invention.

One cross-sectional view of a device 500 of yet another embodiment is depicted schematically (cross-sectional view) in the FIG. 5. The cross-sectional view exhibits the cross-sectional plane that includes the predetermined direction 235 of the fluid flow and the laser beam axis 245, and consequently omits the details of the detector system 160, being placed in-between the subsystems 260 and 265.

The device 500 additionally include a light trap pick off element 510 arranged to redirect a known portion of the laser beam into calibrated power monitor photodetector 520. The device 500 also includes an additional detecting system 530 have been positioned along the additional optical axis 535 and arranged to redirect at least a portion of the light scattered in near-forward direction by particles suspended in a stream of fluid onto at least one additional photodetector 540.

The additional detecting system 530 of the FIG. 5—illustrated embodiment includes a light collector 550 in the form of double-convex lens arranged to image the scattering volume 120 onto the additional photodetector 540. In the illustrated embodiment the photodetector 540 have been represented by a single element APD and the light collector 550 images substantially entire scattering volume 120 onto single sensitive area, the additional detecting system exhibit limited capabilities to separate and count individual particles. Nevertheless, being oriented in a "near-forward" direction, the detecting system 530 offers enhanced resolution capable resolve differences in characteristic dimensions of the scattering particles and determine the distribution of sizes of particles suspended in the fluid.

More particularly, the additional detecting system 530 extends the performance of the device for counting and sizing particles in terms of its ability to discriminate relatively large particles in the 1 μm to 100 μm micrometer size range. It should be known to the practitioners that the APD-based systems' responses to particles which are well above 1 μm in size may result in over-driven (saturated) states, and in such over-driven states the particle size cannot be correctly and accurately determined.

Thus, by providing a separate (e.g. from the ADP) photodetector 540 and corresponding amplifier (not shown) designed and arranged to measure only particles in the 1 μm to 100 μm range, one unprecedented size resolution of particles in the 1 μm to 100 μm can be achieved in a single (integrated) device.

Figure 6:
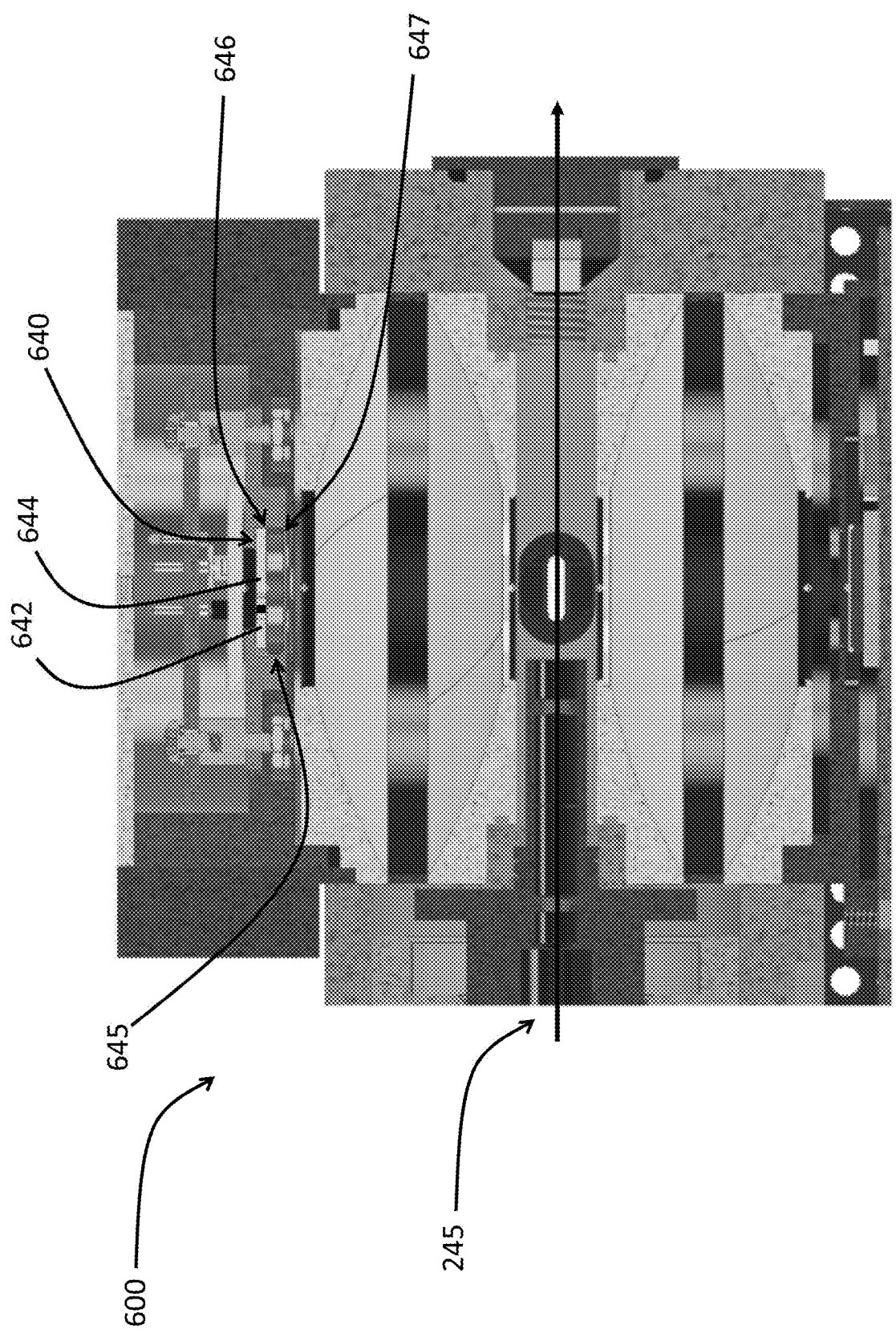
FIG. 6. is a cross-sectional illustration of yet another embodiment of the current invention.

Yet another embodiment of a particle-detecting and particle-sizing system 600 have been depicted schematically (detailed cross-sectional view) in the FIG. 6. The device 600 corresponds to and conceptually bridges various embodiments of the devices 500 and 300. Regarding the particle detecting and sizing system 500, the system 600 utilizes at least another separate dedicated particle-sizing detector 640 and at least one corresponding amplification, processing, and storing electronic module arranged to determine sizes of the scattering particles.

In comparison with the FIG. 3—illustrated embodiment, the system 600 shares significant majority of optical parts and functionalities of the device embodied in the system 300. As such features have been sufficiently disclosed and elaborated above pertinent to the discussions of FIG. 3, only the distinguishing components and functionalities will be addressed herein.

One significant difference from the FIG. 3—illustrated embodiment pertains to one-to-one replacement of the reflecting element 345, substantially centered on and perpendicular to the common optical axis 270, with a transmissive beam splitter 645. In the exemplary system 600, the beam splitter 645 is 1 mm thick, 75% reflective—25% transmissive, has been installed. Rear surface 646 of the beam splitter 645 has been anti-reflectively coated.

In different embodiments different beam-splitting arrangements (transmissive and/or reflective) may be utilized. Beam splitters ranging from mirrors utilizing semi-transparent/semireflective metallic or dielectric multilayered coatings (e.g. having 1% to 50% transparency) may be used. In addition, a sizable class of interference and/or diffraction-based elements potentially utilizing complex nonlinear optical arrangements may be also used. Finally, in different embodiments, wavelength selective dichroic arrangements may be employed, for example, to control noise, improve detectability, and minimize multiple reflections and/or diffuse scattering.

Consequently, regarding the scattered light that does not reach the beam splitter 645 and the portion of the scattered light reflected by the beam splitter 645, there are no significant differences in propagation and detection between the systems 300 and 600. A significant portion of the scattered light that impacts the front surface 647 of the beam splitter and being transmitted through the beam splitter 645 and the anti-reflective rear surface 646, has been arranged to be intercepted and detected by the photosensitive element 640.

In the illustrated embodiment of the system 600, the photosensitive element 640 has been represented by a silicon PIN detector having 2 mm×7 mm active area, and pressed to be within 0.05 mm from the rear surface 646. As illustrated, the Active area of the detector 640 has been subdivided into at least two unequal segments. In the particular embodiment, a smaller-area segment 642 has been arranged to precede a larger-area segment 644 relative to the laser beam propagation (i.e. "upstream" with respect to the orientation of the laser beam axes 245.)

Motivation for the illustrated arrangement is based on the facts intrinsic to the scattering of light on particles having characteristic dimensions on the order or larger that the wavelength of the scattered light ("Mie Scattering"). Such scattering is known to have an anisotropic cross section being significantly enhanced in the forward (i.e. "small scattering angle") directions. Thus, in the case of presence of significant number of approximately 1 µm (or larger) particles in the scattering volume 120, the exiting portions of the scattering volume 120 away from the laser may be detectably "shaded" by the presence of the scatterers upstream along the beam axis 245, as illustrated in the schematic in FIG. 7.

Figure 7:
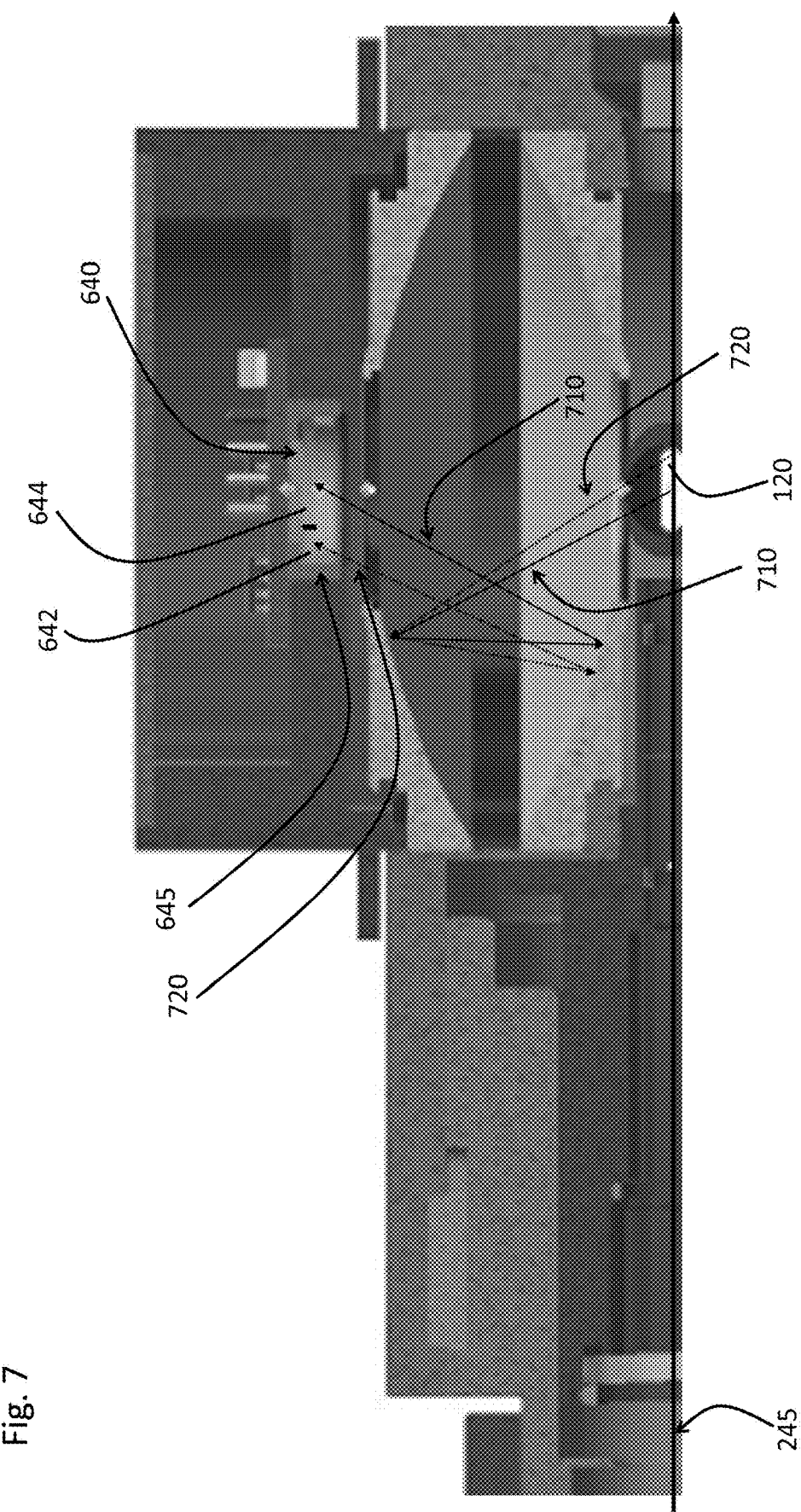
FIG. 7. is another cross-sectional illustration of one embodiment of the current invention.

As it may be observed in FIG. 7, the transmitted portion of the scattering light scattered from the "up the beam" portion of the scattering volume 120 (indicated by the ray 710) ends up on the segment 644, while the "down the beam" (i.e. potentially shaded) portion of the transmitted scattered light 720 (scattered by the particles suspended in the "down the beam" portion of the scattering volume), get detected by the segment 642. Thus, the variation of the laser beam intensity potentially caused by the "shading" may be compensated, at least in the first order" by adjustments of relative sensitivity between the segments 642 and 644. As discussed above, the presented feature is of particular importance in the presence of (undesirable)"large particles" (having characteristic dimensions on the order or in excess of 1 µm).

While specific values, relationships, materials and components have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the embodiments and certain modifications of the concepts underlying the present invention, various other embodiments as well as certain variations and modifications of the embodiments herein shown and described will obviously occur to those skilled in the art upon becoming familiar with such underlying concepts. It is intended to include all such modifications, alternatives, and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

We claim:

1. A device for counting and sizing particles suspended in a stream of fluid flowing in a predominant flow direction, comprising:
   a fluid stream forming system having a directional element arranged to form the stream of fluid flowing in predetermined direction of fluid flow;
   a laser beam forming optical system including at least one source of laser light having at least one wavelength between 200 nm and 1000 nm, at least one profiling optical subsystem, having at least one collimator lens and at least one convergent lens, positioned to arrange the laser light in a laser beam along a laser beam axis directed to illuminate a prearranged scattering volume of the stream of fluid, and at least one laser beam dump;
   a scattered light collector subsystem arranged to collect and detect at least a portion of light redirected by the suspended particles from the laser beam having at least one wide-angle detecting subsystem and at least one corresponding wide-angle back-reflecting subsystem; and
   an electronic signal-processing subsystem arranged to process and interpret distinct electronic responses generated by the at least one wide-angle detecting subsystem and determine count and size pertinent to the particles suspended in a stream of fluid;
   wherein, the at least one wide-angle detecting subsystem and the at least one corresponding wide-angle back-reflecting subsystem share a common optical axis simultaneously perpendicular to the laser beam axis and the predetermined direction of fluid flow;
   wherein, at least one wide-angle detecting subsystem incorporates at least one photodetector arranged and positioned for repetitive detection of the laser light scattered by the particles suspended in the scattering volume of the stream of fluid and generation of the distinct electronic responses; and
   wherein, the at least one wide-angle detecting subsystem and at least one corresponding wide-angle back-reflecting subsystem have been aligned to collect and redirect the portions of the light scattered by a single particle suspended in the prearranged scattering volume of the stream of fluid on a single pixel of the photosensitive elements.

2. The device for counting and sizing particles in claim 1, wherein the at least one source of laser light includes at least one blue laser diode empowered to emit power output of no less than 0.2W, up to operating temperature of 80° C.

3. The device for counting and sizing particles in claim 2, wherein the at least one source of laser light includes at least one blue strip diode laser having an emitter not shorter than 10 µm.

4. The device for counting and sizing particles in claim 2, wherein the at least one source of laser light includes at least one blue laser empowered to emit power output of no less than 1.5W and having an emitter no shorter than 15 µm.

5. The device for counting and sizing particles in claim 2, wherein the at least one source of laser light includes at least one blue laser empowered to emit power output of no less than 1W and having an emitter no shorter than 30 µm.

6. The device for counting and sizing particles in claim 1, wherein the at least one photodetector arranged and positioned repetitive detection of laser light scattered by the particles suspended in the scattering volume of the stream of fluid incorporates at least one sensor array sensitive to the blue light range of wavelengths; said sensor array implements absorption, gain, and intrinsic layer regions placed in proximity of the sensor surfaces in arrangement optimized with respect to rejection of background radiation and reduction of background count.

7. The device for counting and sizing particles in claim 6, wherein the at least one photodetector has been arranged and shielded from background radioactivity and muon-related cosmic radiation to suppress the background count to less than 10 counts in one hour.

8. The device for counting and sizing particles in claim 1, where the stream of fluid in which the particles are suspended is air, flowing at a rate of about 20 to 100 liters per minute, and the suspended particles have a characteristic dimension in the range of 50 nm to 100 µm.

9. The device for counting and sizing particles in claim 1, wherein the at least one collimator lens have focal length from 2 mm to 10 mm and magnification from 20× to 60×.

10. The device for counting and sizing particles in claim 1, wherein the at least one convergent lens have focal length from 20 mm to 200 mm.

11. The device for counting and sizing particles in claim 1, wherein the at least one wide-angle detecting subsystem incorporates at least two mirrors positioned to share the common optical axis, and the at least one photodetector placed centered and perpendicular to the common optical axis.

12. The device for counting and sizing particles in claim 11, wherein the at least one of the at least two mirrors is a parabolic mirror positioned to share the common optical axis.

13. The device for counting and sizing particles in claim 12, wherein the at least one wide-angle detecting subsystem incorporates two parabolic mirrors with about 10 mm to 50 mm focal lengths positioned to share the common optical axis, and the at least one photodetector is a multi-element APD detector placed centrally and perpendicular to the common optical axis.

14. The device for counting and sizing particles in claim 13, wherein the at least one wide-angle back-reflecting subsystem is positioned in opposition to the at least one wide-angle detecting subsystem with respect to the scattering volume and arranged to share the common optical axis, and incorporates two parabolic mirrors with about 10 mm to 50 mm focal lengths and at least one reflecting element placed centrally and perpendicular to the common optical axis.

15. The device for counting and sizing particles in claim 14, wherein the at least one reflecting element is a flat mirror.

16. The device for counting and sizing particles in claim 14, wherein the at least one reflecting element is a long focal length spherical mirror having a spherical radius from about 20 mm to about 200 mm.

17. The device for counting and sizing particles in claim 14, wherein the at least one reflecting element is a long focal length cylindrical mirror having a cylindrical radius from about 20 mm to about 200 mm.

18. The device for counting and sizing particles in claim 14, wherein the at least one wide-angle back-reflecting subsystem incorporates at least one beam splitter arranged to transmit between 1% and 50% of incident light scattered by the particles suspended in the scattering volume.

19. The device for counting and sizing particles in claim 18, wherein the at least one beam splitter incorporate at least one antireflective coating.

20. The device for counting and sizing particles in claim 18, wherein at least one rear surface of the at least one beam splitter has been arranged in proximity to at least another particle-sizing detector.

21. The device for counting and sizing particles in claim 20, wherein the to at least another particle-sizing detector incorporates at least one photodetector has been subdivided into at least two unequal segments, including at least one smaller-area segment and at least one larger-area segment.

22. The device for counting and sizing particles in claim 21, wherein the at least one smaller-area segment has been arranged to detect at least a portion of the light scattered by the particles suspended in the down the beam portion of the scattering volume, while the at least one larger-area segment has been arranged to detect at least a portion of the light scattered by the particles suspended in the up the beam portion of the scattering volume.

23. The device for counting and sizing particles in claim 22, wherein the at least one smaller-area segment has been arranged for higher light sensitivity than the at least one larger-area segment.

24. The device for counting and sizing particles in claim 13, wherein the at least one multi-element APD detector incorporates linear array of pixels, up to 20 mm in length, such that several proximal pixels can be connected in parallel to form a plurality of photosensitive elements of predetermined area.

25. The device for counting and sizing particles in claim 24, wherein a single pixel length is more than or equal to 0.1 mm and less than or equal to 3 mm, and a single pixel width is more than or equal to 0.5 mm and less than or equal to 4 mm.

26. The device for counting and sizing particles in claim 24, wherein the at least one wide-angle detecting subsystem and at least one corresponding wide-angle back-reflecting subsystem have been aligned to collect and redirect the portions of the light scattered by a single particle suspended in the prearranged scattering volume of the stream of fluid on a common spot on the at least one multi-element APD detector having area commensurate with the predetermined areas of the photosensitive elements.

27. The device for counting and sizing particles in claim 26, wherein the common spot on the at least one multi-element APD detector has an area more than or equal to 0.5 $mm^2$ and less than or equal to 5 $mm^2$.

28. The device for counting and sizing particles in claim 1, wherein at least one additional detecting system have been arranged along an additional optical axis intercepting the laser beam axis and forming an oblique angle with the laser beam axis.

29. The device for counting and sizing particles in claim 28, wherein at least one additional detecting system is positioned along the additional optical axis and arranged to redirect at least a portion of the light scattered in near-forward direction by particles suspended in a stream of fluid onto at least one additional photodetector.

30. The device for counting and sizing particles in claim 28, wherein the at least one additional photodetector have been arranged to generate electronic signal commensurate to the characteristic dimensions of particles suspended in a stream of fluid.

* * * * *